US011535216B2

(12) United States Patent
Gabbianelli et al.

(10) Patent No.: US 11,535,216 B2
(45) Date of Patent: Dec. 27, 2022

(54) BRAKE BY WIRE

(71) Applicant: MAGNA INTERNATIONAL INC., Aurora (CA)

(72) Inventors: Frank Gabbianelli, Birmingham, MI (US); Todd Deaville, Markham (CA); Matthew Williamson, Richmond Hill (CA); Benjamin Saltsman, Bloomfield Township, MI (US); Warren Young, Troy, MI (US); Timothy Reaburn, LaSalle (CA)

(73) Assignee: MAGNA INTERNATIONAL INC., Aurora (CA)

( * ) Notice: Subject to any disclaimer, the term of this patent is extended or adjusted under 35 U.S.C. 154(b) by 260 days.

(21) Appl. No.: 16/612,835

(22) PCT Filed: May 14, 2018

(86) PCT No.: PCT/US2018/032526
§ 371 (c)(1),
(2) Date: Nov. 12, 2019

(87) PCT Pub. No.: WO2018/209338
PCT Pub. Date: Nov. 15, 2018

(65) Prior Publication Data
US 2020/0139946 A1    May 7, 2020

Related U.S. Application Data

(60) Provisional application No. 62/629,853, filed on Feb. 13, 2018, provisional application No. 62/572,764, (Continued)

(51) Int. Cl.
*B60T 8/40* (2006.01)
*B60T 8/32* (2006.01)
(Continued)

(52) U.S. Cl.
CPC .............. *B60T 8/326* (2013.01); *B60T 7/042* (2013.01); *B60T 8/4031* (2013.01);
(Continued)

(58) Field of Classification Search
CPC ...... B60T 8/4018; B60T 8/4022; B60T 8/404; B60T 8/4081; B60T 13/586; F04C 2/102; F04C 15/0065
See application file for complete search history.

(56) References Cited

U.S. PATENT DOCUMENTS 4,193,746 A * 3/1980 Aman, Jr. ............... F04C 14/04
                                                        418/32
5,064,254 A   11/1991 Benzinger et al.
(Continued)

FOREIGN PATENT DOCUMENTS

CN       102256841 A    11/2011
DE       3923742 A1     1/1991
(Continued)

OTHER PUBLICATIONS

Machine translation of DE 10201202421, retrieved Nov. 19, 2021 (Year: 2021).*
(Continued)

*Primary Examiner* — Bradley T King
(74) *Attorney, Agent, or Firm* — Dickinson Wright PLLC

(57) ABSTRACT

An electrohydraulic actuator assembly for use in a brake-by-wire hydraulic brake system. The electrohydraulic actuator assembly includes a pair of electrohydraulic actuator EHA units. One EHA unit provides fluid to front brakes and the other EHA unit provides fluid to rear brakes. Each EHA unit includes an electric motor, a reduction gear unit, a pair of magnetorheological clutches, and a pair of fluid pumps. The system further including an ECU that actuates the electric motor and controls engagement of the clutches to
(Continued)

cause the fluid pump to pump brake fluid to at least one of the front and rear brakes. The system further includes a regeneration system for providing supplemental electricity to the electric motors.

9 Claims, 8 Drawing Sheets

Related U.S. Application Data filed on Oct. 16, 2017, provisional application No. 62/505,358, filed on May 12, 2017.

(51) Int. Cl.
| | | |
|---|---|---|
| B60T 7/04 | (2006.01) | |
| B60T 13/58 | (2006.01) | |
| B60T 13/66 | (2006.01) | |
| B60T 13/74 | (2006.01) | |
| F04C 2/10 | (2006.01) | |
| F04C 15/00 | (2006.01) | |
| F16D 48/06 | (2006.01) | |

(52) U.S. Cl.
CPC .......... *B60T 8/4086* (2013.01); *B60T 13/586* (2013.01); *B60T 13/662* (2013.01); *B60T 13/745* (2013.01); *F04C 2/102* (2013.01); *F04C 15/0065* (2013.01); *B60T 2270/404* (2013.01); *B60T 2270/413* (2013.01); *B60T 2270/82* (2013.01); *F16D 48/064* (2013.01)

(56) References Cited

U.S. PATENT DOCUMENTS

| | | | | |
|---|---|---|---|---|
| 5,971,500 A * | 10/1999 | Voges | ............... | B60T 8/4013 |
| | | | | 303/113.4 |
| 6,050,654 A * | 4/2000 | Gegalski | ............... | B60T 8/326 |
| | | | | 251/129.02 |
| 6,142,581 A * | 11/2000 | Yamaguchi | ............... | B60T 7/12 |
| | | | | 303/113.2 |
| 6,152,717 A * | 11/2000 | Morita | ............... | F04C 2/102 |
| | | | | 418/107 |
| 6,220,675 B1 * | 4/2001 | Steffes | ............... | B60T 8/4275 |
| | | | | 303/116.2 |
| 6,474,751 B1 * | 11/2002 | Yamaguchi | ............... | B60T 7/12 |
| | | | | 303/116.4 |
| 6,688,866 B2 * | 2/2004 | Lambert | ............... | F04C 2/086 |
| | | | | 418/135 |
| 9,002,608 B2 | 4/2015 | Crombez | | |
| 2001/0029408 A1 * | 10/2001 | Murray | ............... | G05B 9/03 |
| | | | | 701/1 |
| 2003/0234574 A1 | 12/2003 | Reuter et al. | | |
| 2004/0035656 A1 * | 2/2004 | Anwar | ............... | B60L 50/16 |
| | | | | 188/161 |
| 2004/0070269 A1 * | 4/2004 | Anwar | ............... | B60L 3/0061 |
| | | | | 303/152 |
| 2005/0126875 A1 | 6/2005 | Bruder | | |
| 2005/0162011 A1 | 7/2005 | Moradmand et al. | | |
| 2008/0048492 A1 | 2/2008 | Sakai | | |
| 2010/0282549 A1 | 11/2010 | Feigel et al. | | |
| 2011/0254358 A1 | 10/2011 | Strengert et al. | | |
| 2012/0070324 A1 * | 3/2012 | Haecker | ............... | H02K 7/14 |
| | | | | 417/415 |
| 2012/0212042 A1 | 8/2012 | Kunz | | |
| 2013/0192222 A1 * | 8/2013 | Nomura | ............... | B60T 8/4077 |
| | | | | 60/545 |
| 2013/0207452 A1 * | 8/2013 | Gilles | ............... | B60T 8/4018 |
| | | | | 303/9.75 |
| 2015/0375726 A1 * | 12/2015 | Roll | ............... | B60T 8/4827 |
| | | | | 303/3 |
| 2016/0221560 A1 * | 8/2016 | Yang | ............... | B60T 7/042 |
| 2018/0326959 A1 * | 11/2018 | Micke | ............... | B60T 13/662 |

FOREIGN PATENT DOCUMENTS

| | | | | |
|---|---|---|---|---|
| DE | 10039781 A1 * | 2/2002 | ............... | B60T 13/745 |
| DE | 10055384 A1 | 6/2002 | | |
| DE | 102011017436 A1 | 10/2012 | | |
| DE | 102012020421 A1 * | 4/2014 | ............... | B60T 13/662 |
| JP | 2012245826 A | 12/2012 | | |
| WO | 2008071577 A1 | 6/2008 | | |
| WO | WO-2012034740 A1 * | 3/2012 | ............... | B60T 13/162 |
| WO | 2017015763 A1 | 2/2017 | | |

OTHER PUBLICATIONS

Machine translation of DE 10039781, retrieved Nov. 20, 2021 (Year: 2021).*
Machine translation of WO2012/034740, retrieved Apr. 9, 2022 (Year: 2022).*
Communication pursuant to Article 94(3) EPC in corresponding EP patent application No. 18 798 209.5, dated Jun. 30, 2022, 6 pgs.

* cited by examiner

BRAKE BY WIRE

CROSS-REFERENCE TO RELATED APPLICATIONS

This U.S. National Stage Patent Application claims the benefit of PCT International Patent Application Serial No. PCT/US2018/032526 filed May 14, 2018 entitled "Brake By Wire" which claims the benefit of U.S. Provisional Patent Application Ser. No. 62/505,358 entitled "Brake By Wire," filed May 12, 2017, U.S. Provisional Patent Application Ser. No. 62/572,764 entitled "Brake By Wire," filed Oct. 16, 2017 and U.S. Provisional Patent Application Ser. No. 62/629,853 entitled "Brake By Wire," filed Feb. 13, 2018. The entire disclosures of the applications being considered part of the disclosure of this application, and hereby incorporated by reference.

FIELD

The present disclosure relates generally to brake systems for vehicles. More particularly, the present disclosure relates to an electro-hydraulic actuator for a brake-by-wire system that is configured to operate with an otherwise traditional hydraulic brake system.

BACKGROUND

This section provides background information related to motor vehicle braking systems and may not necessarily be prior art to the inventive concepts of the present disclosure.

Current brake systems used in motor vehicles can be generally classified into one of three distinct categories including a vacuum-assisted braking system (VABS), an electro-hydraulic brake system (EHBS), and an electro-mechanical brake system (EMBS). In the first two categories, a pedal force applied directly to the brake pedal by a vehicle operator is required to actuate the hydraulic brake system, while a vacuum system is employed to provide an "assist" to the operator via a brake booster. The vacuum system typically includes a vacuum pump controlled in direct relation to engine operation or, in the alternative, controlled independently via an electrical motor. In such hydraulic brake systems, the pedal acts on a master cylinder such that fluid pressure is generated and supplied via hydraulic brake lines to the brake calipers for actuating the brakes. In contrast, the EMBS employs electric brake actuators, located at each wheel, and configured to generate the required brake force in response to a brake signal from a pedal sensor associated with the brake pedal to provide a "brake-by-wire" arrangement with no direct operator pedal force or vacuum assist required. Disadvantages associated with known EMBS include the system complexity and cost required by expensive e-motors and caliper systems which typically limits application to high performance and premium vehicles. Thus, a recognized need exists to develop alternative brake-by-wire systems which overcome such shortcomings and which can be readily incorporated in otherwise conventional hydraulic brake systems.

SUMMARY

This section provides a general summary of the disclosure and is not intended to be considered a complete and exhausting list of its full scope or all of its features.

It is an aspect of the present disclosure to provide an electrohydraulic brake system having at least one electrohydraulic actuator (EHA) unit capable of being used in association with a traditional caliper-type hydraulic brake system and which provides a "brake-by-wire" functionality.

It is another aspect of the present disclosure that the EHA unit is configured for integration into an on-board regeneration system of the type commonly provided in electric and hybrid vehicles.

In accordance with these and other aspects, the electrohydraulic brake system of the present disclosure includes a brake pedal and at least one front hydraulic brake and at least one rear hydraulic brake. A brake sensor is configured to detect movement of the brake pedal and an electronic control unit (ECU) is operable to receive a brake signal from the brake sensor or an Advanced Drive Assistance System (ADAS) ECU. An electrohydraulic actuator assembly includes at least one electrohydraulic actuator (EHA) unit that includes an electric motor, a reduction unit driven by the electric motor, at least one electrically-controlled clutch having a clutch input driven by the reduction unit, and at least one fluid pump driven by a clutch output of the clutch. The ECU is configured to actuate the electric motor and control engagement between the clutch input and the clutch output to cause the fluid pump to pump brake fluid to at least one of the front or rear brakes to execute independent braking control of each wheel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic diagram of an electrohydraulic brake system for a motor vehicle and being equipped with an electrohydraulic actuator assembly having a pair of electrohydraulic actuators (EHA) units, the electrohydraulic actuator assembly being constructed in accordance with the teachings of the present disclosure and integrated into the electrohydraulic brake system to provide a brake-by-wire brake functionality;

Figure 3:
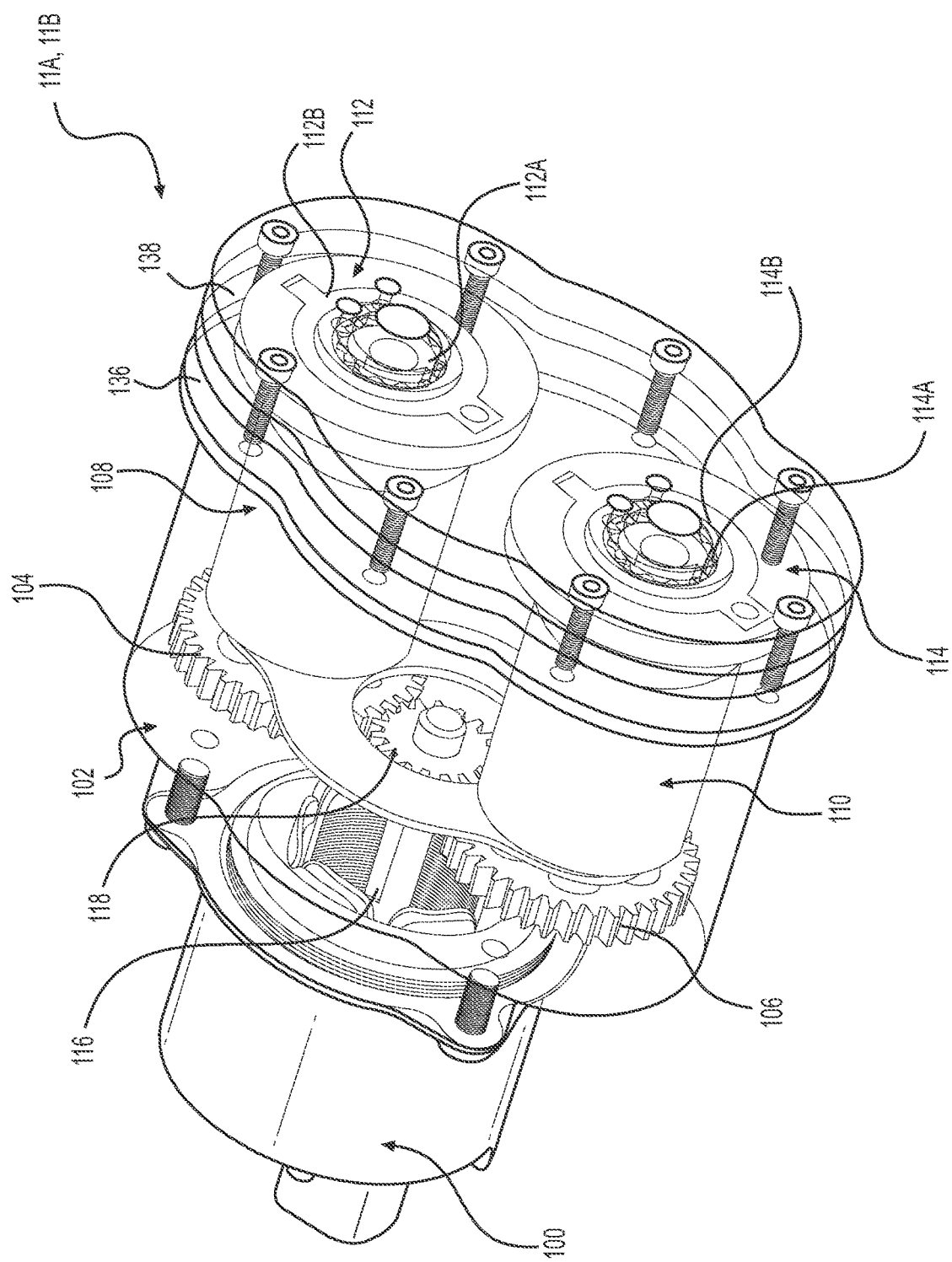
FIG. 3 is an enlarged isometric view of one EHA unit of the electrohydraulic actuator assembly and which is configured to include an electric motor, a dual output gear reduction unit, and a pair of magnetorheological (MR) clutches each driving a corresponding one of a pair of gerotor pumps.
Figure 4B:
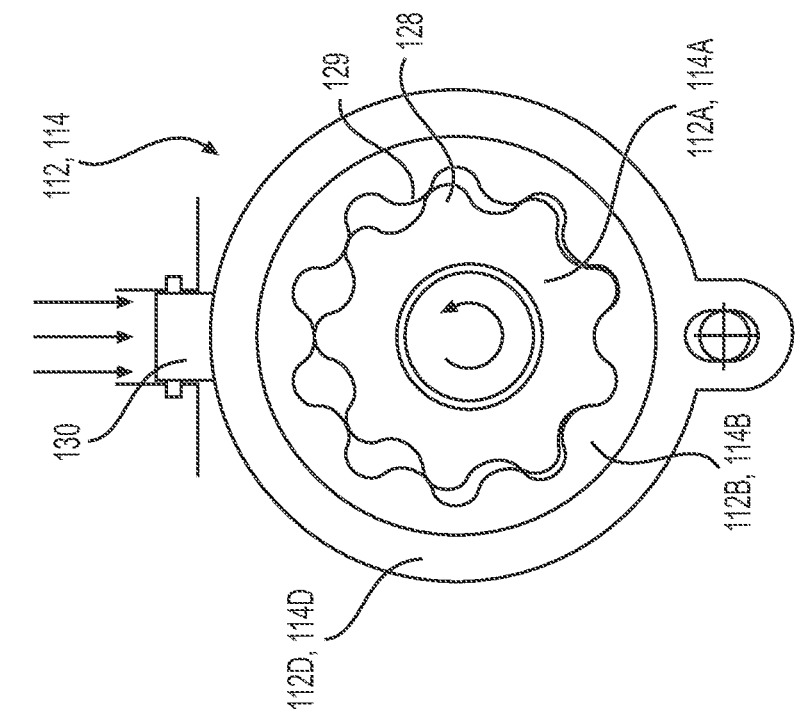
FIGS. 4A and 4B illustrate a non-limiting configuration of the gerotor pump shown in FIG. 3.
Figure 4A:
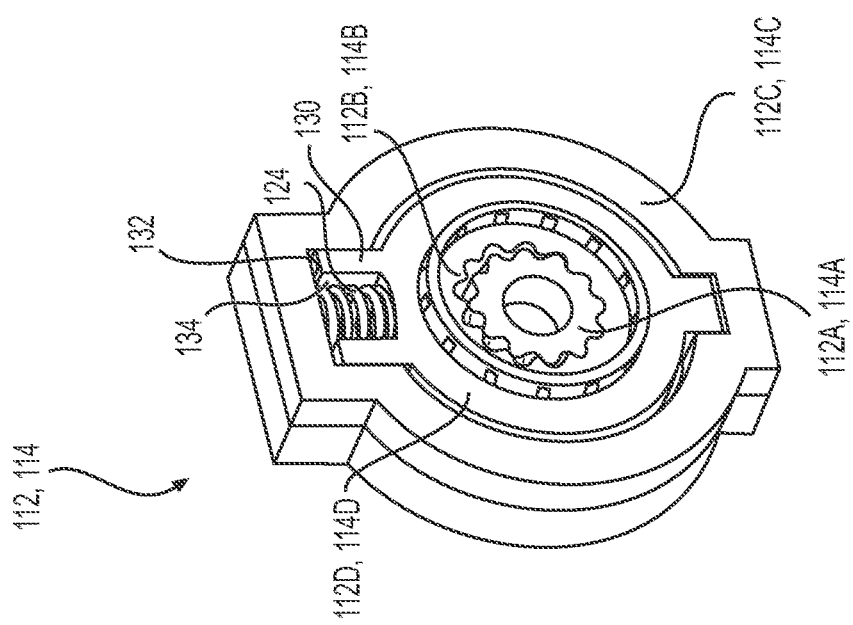
Figure 5A:
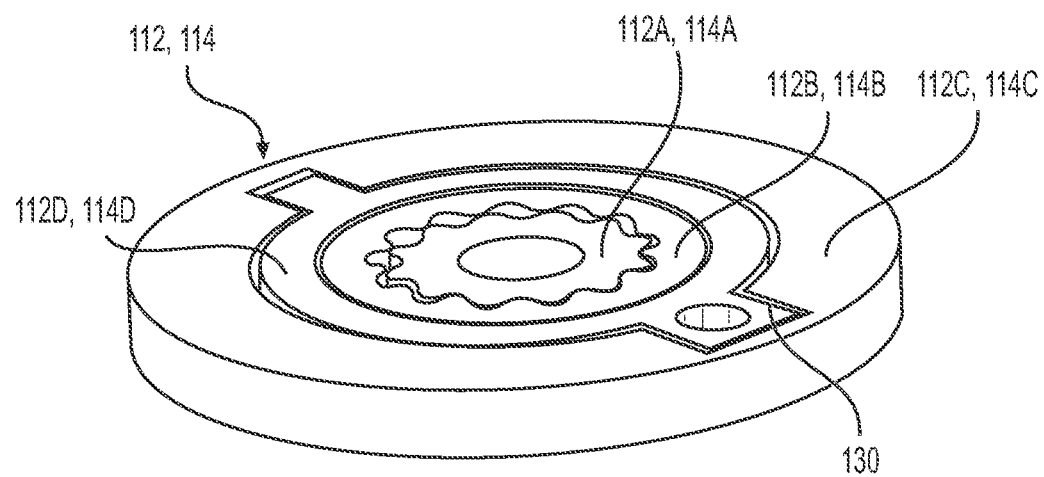
Figure 5B:
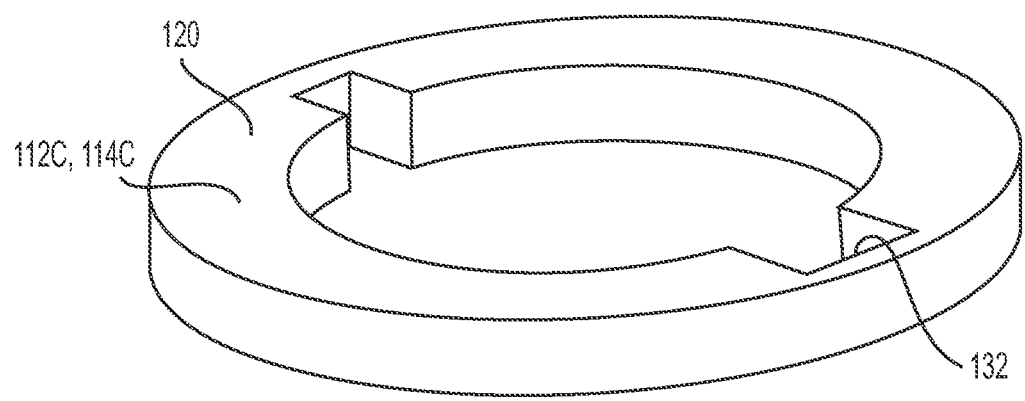
Figure 5C:
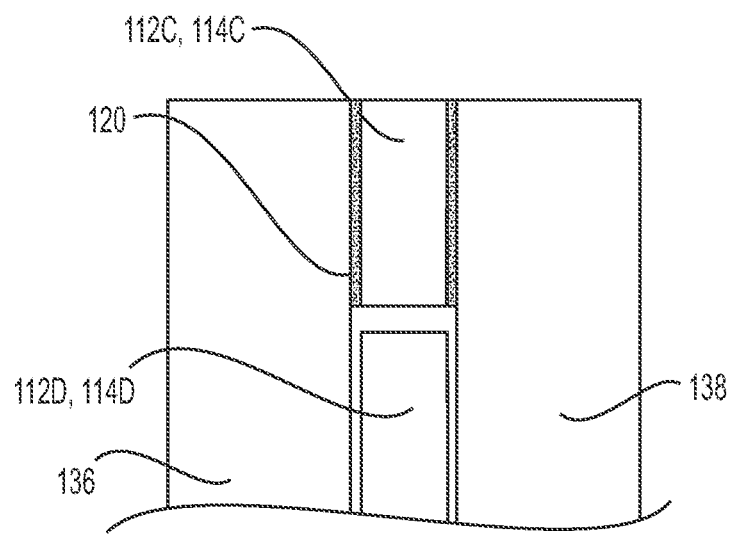
Figure 5D:
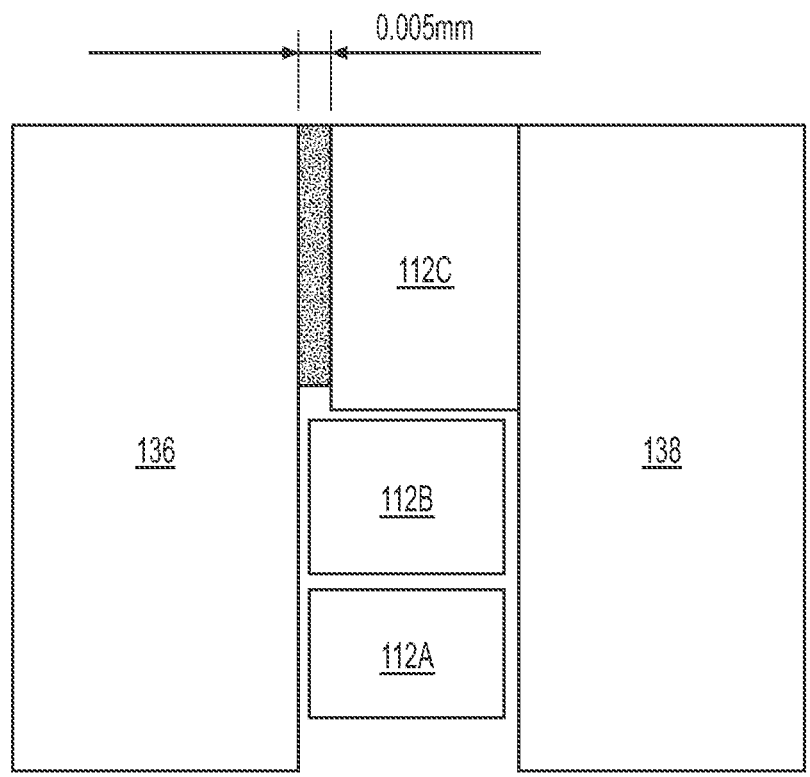
Figure 6:
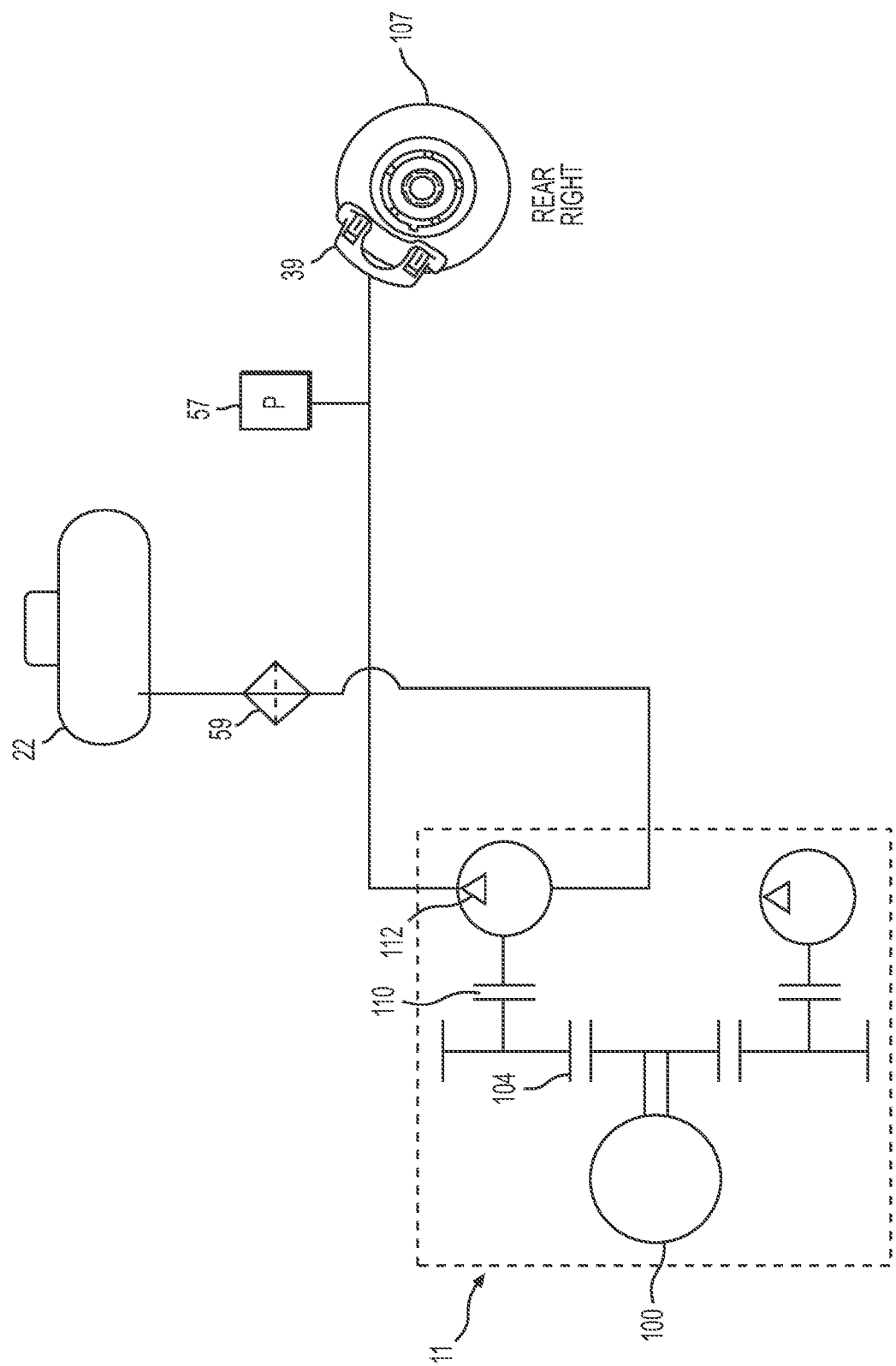
Figure 7:
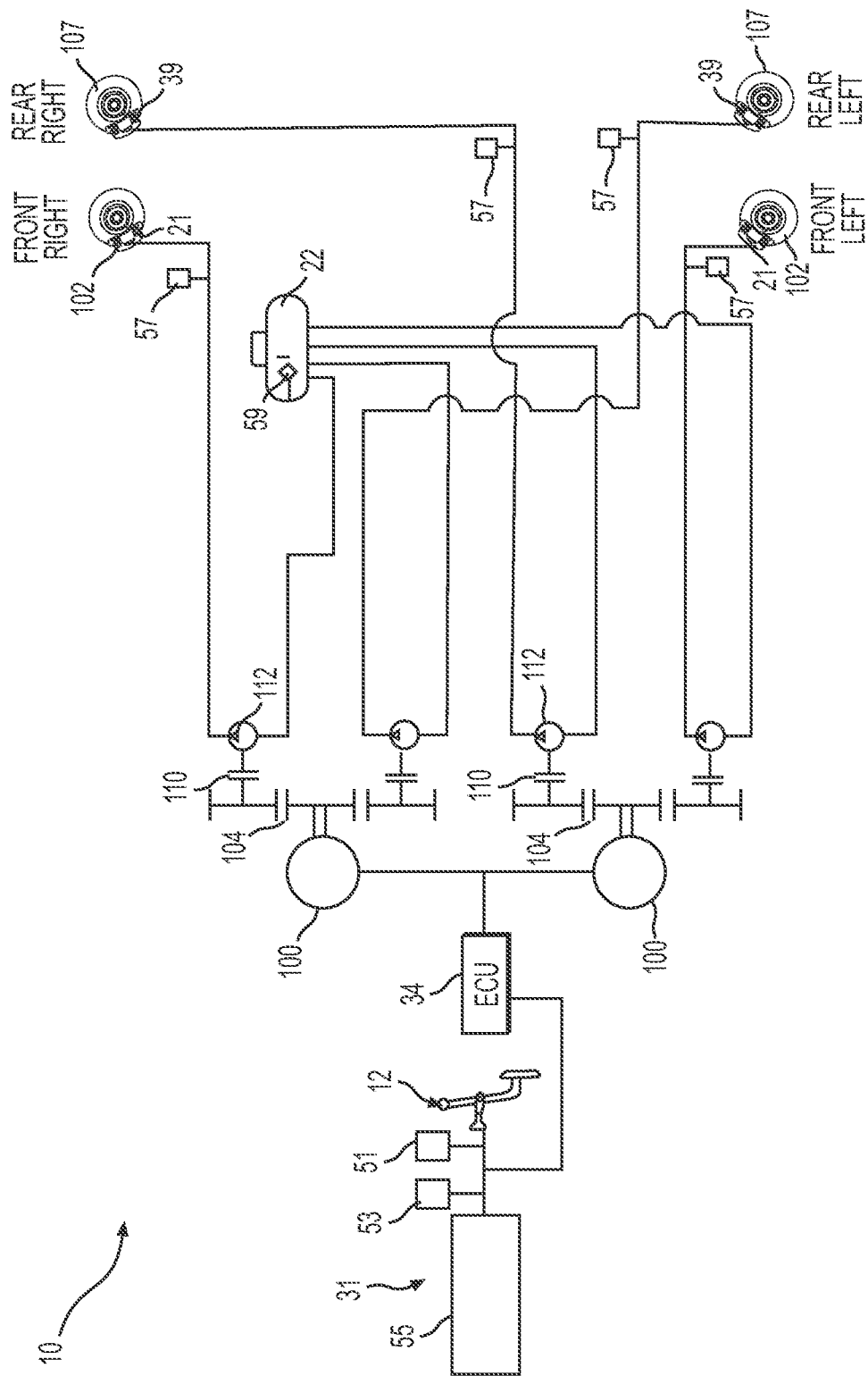

FIGS. 5A, 5B, 5C and 5D disclose a method of assembling the gerotor pump shown in FIGS. 3 and 4;

FIG. 6 is a schematic diagram illustrating one of the electrohydraulic actuator (EHA) units supplying fluid to a front brake; and FIG. 7 is a schematic diagram illustrating the electrohydraulic brake system wherein the pair of electrohydraulic actuator (EHA) units are operable with diagonal front and rear brakes.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

An example embodiment of an electrohydraulic actuator assembly is provided so that this disclosure will be thorough, and will fully convey the scope to those who are skilled in the art. The electrohydraulic actuator assembly is shown operably associated with electrohydraulic brake systems within motor vehicle to provide "brake-by-wire" functionality. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
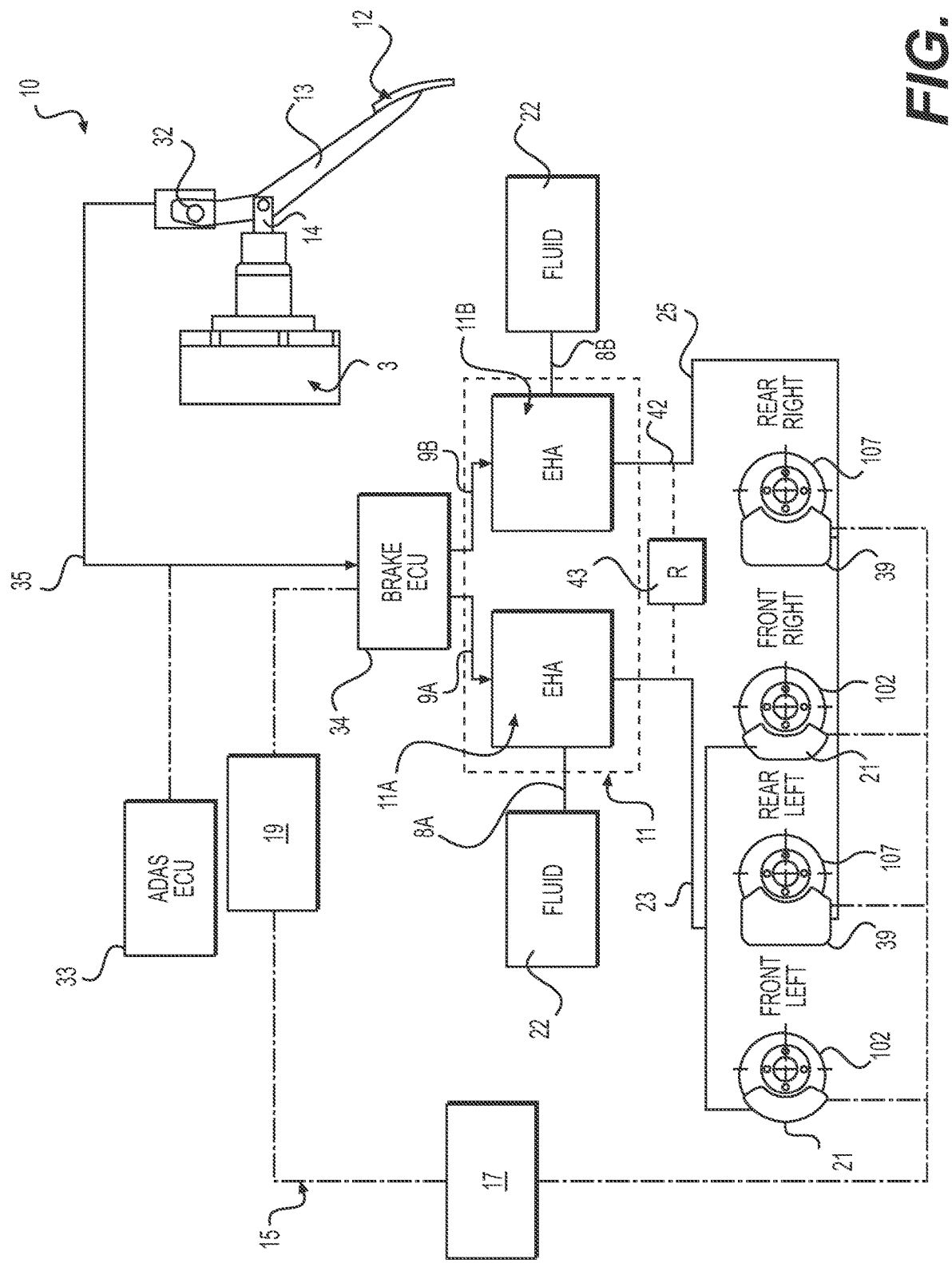

Referring initially to FIG. 1, an illustrative non-limiting embodiment of an electrohydraulic "brake-by-wire" vehicle brake system 10 is shown and which is configured for use in a motor vehicle having a propulsion arrangement (i.e. internal combustion engine, hybrid electric, battery electric, etc.) capable of generating and delivering rotary power (i.e. drive torque) to at least one pair of wheels. Brake system 10 is configured to generate and apply a hydraulic braking pressure to at least one set of the front wheels 102 and the rear wheels 107, and preferably to both sets of front and rear wheels. As best illustrated in FIG. 7, the brake system 10 may alternatively execute a diagonal (X-pattern) control, for example front left and rear right. The brake system 10 illustrated in FIG. 7 further includes a brake sensor 31 having a pedal displacement sensor 51, a pedal force sensor 53, and a brake feel emulator unit 55. To this end, the present disclosure is directed to an electrohydraulic actuator assembly 11 comprised of a pair of electrohydraulic actuator ("EHA") units 11A, 11B that are configured to generate the desired hydraulic brake pressure for delivery via otherwise standard brake lines to otherwise standard brake calipers associated with each of the front wheels 102 and the rear wheels 107.

As shown in FIG. 1, brake system 10 includes an integrated pedal "feel" simulator unit 3 to generate brake pedal feel (tactile or haptic feedback). A brake pedal 12 is coupled to pedal simulator unit 3 via a pushrod 14. A pedal sensor 32, or equivalent detection unit, is coupled to an arm segment 13 of brake pedal 12 and functions to provide a signal, referred to as a brake actuation input signal, indicative of the pedal travel and pressure exertion caused in response to the vehicle operator actuating brake pedal 12. An electronic controller unit (ECU) 34 is connected to pedal sensor 32 via an electrical connection, indicated schematically by lead line 35. A brake sensor 31 may be provided between the ECU 34 and pedal sensor 32 to provide additional functionality in autonomous systems, where the braking ECU may receive a brake signal directly from ADAS ECU 33 bypassing brake pedal. A pair of front hydraulic brakes 21 are adapted to apply a hydraulically-actuated brake pressure to front wheels 102 in response to ECU 34 actuating electrohydraulic actuator assembly 11 resulting from the brake actuation input signal provided to ECU 34 by pedal sensor 32. A front hydraulic fluid circuit, indicated schematically by lead line 23, connects front brakes 21 to electrohydraulic actuator assembly 11. Likewise, a pair of rear hydraulic brakes 39 are adapted to apply a hydraulically-actuated brake pressure to rear wheels 107 in response to ECU 34 actuating electrohydraulic actuator assembly 11 as a result of the brake actuation input signal from pedal sensor 32. A rear hydraulic fluid circuit, indicated schematically by lead line 25, connects rear brakes 39 to electrohydraulic actuator assembly 11. As such, braking system 10 employs pedal sensor 32 to provide the pedal actuation input signal to ECU 34 in an arrangement void of an otherwise conventional booster unit and master cylinder. It should also be appreciated that ECU 34 and hydraulic fluid circuits 23, 25 may be configured to apply hydraulic braking force to any combination of front and rear brakes 21, 39 in response to the brake actuation input signal from pedal sensor 32. To this extent, pedal sensor 32 can be an electro-mechanical device electrically connected to the ECU 34. In turn, ECU 34 controls operation of electrohydraulic actuator units 11A, 11B. Thus, this non-limiting example illustrates one brake-by-wire braking system 10 configured to be easily integrated into an otherwise conventional vehicular hydraulic brake system. Furthermore, the electrohydraulic actuator assembly 11 and ECU 34 can be integrated into a highly autonomous system. Specifically, the ECU 34 can enable autonomous brake capability to activate front or rear brakes 21, 39 or independent wheel brake control without input from a driver based on ADAS ECU 33 command.

The ECU 34 is illustrated in FIG. 1 to have electrical connections, schematically indicated by lead lines 9A and 9B, for providing electric control signals to both EHA units 11A, 11B of electrohydraulic actuator assembly 11. EHA units 11A and 11B are each fluidically connected to a supply of brake fluid 22, as schematically indicated by respective hydraulic lines 8A and 8B. In operation, actuation of electrohydraulic actuator assembly 11 based on the input signal from pedal sensor 32 or ADAS ECU 22 command results in pressurized brake fluid being supplied to front brakes 21 via front hydraulic brake circuit 23 and further results in pressurized brake fluid being supplied to rear brakes 39 via rear hydraulic brake circuit 25. The schematic arrangement is provided to show that electrohydraulic actuator assembly 11 is easily applicable to vehicles having hydraulically-actuated brakes.

Still referring to FIG. 1, EHA units 11A and 11B can also be adapted for use with a regeneration system 15. During braking, the regeneration system 15 transfers kinetic energy from the front and/or rear brakes 21, 39 via a drivetrain (not shown). The transferred kinetic energy flows into a generator 17 that converts it into electric energy that can be either stored in a battery 19, for controlled distribution by the ECU 34, or fed directly to the EHA units 11A and 11B automatically during braking.

Figure 2:
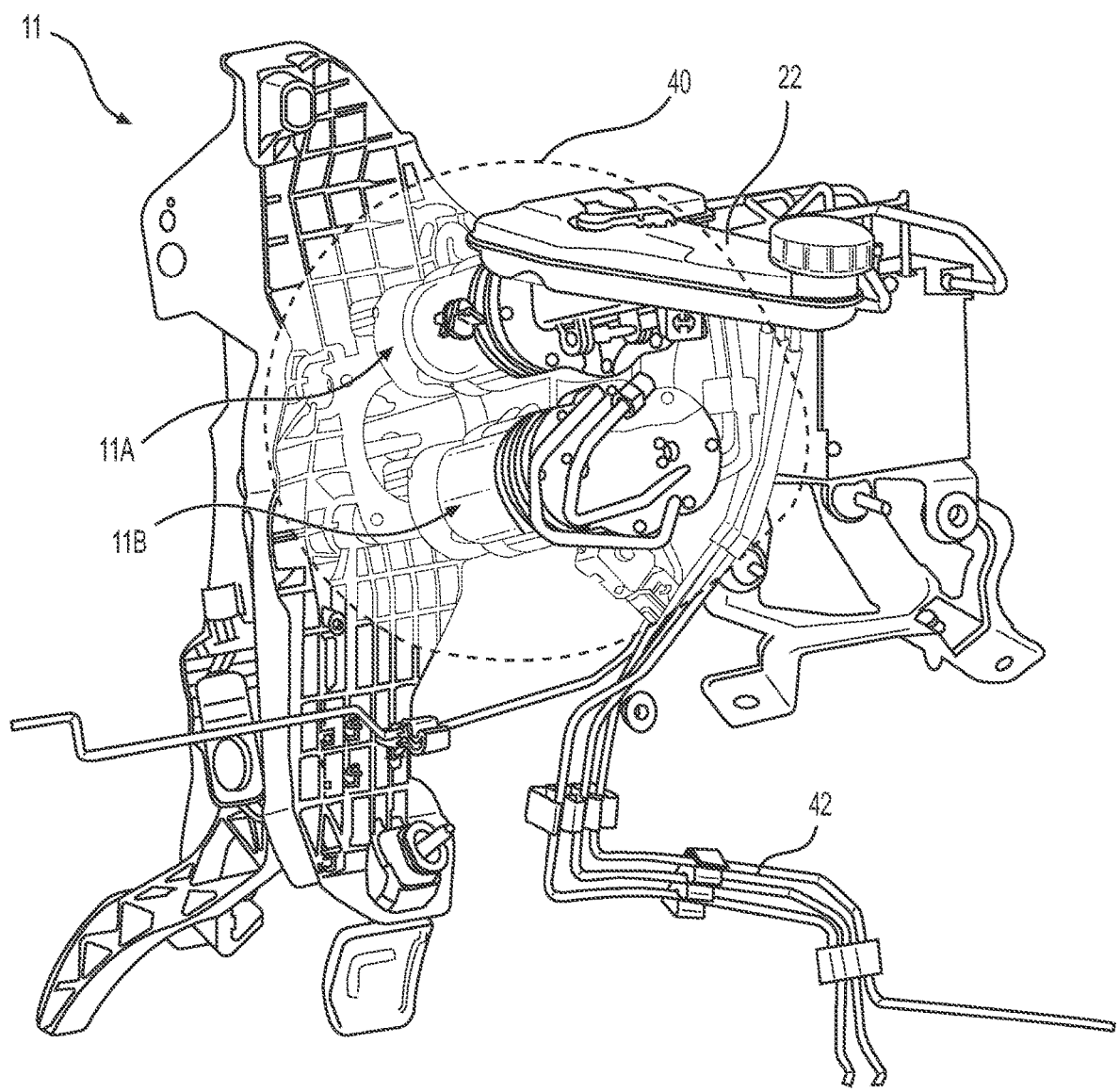
FIG. 2 is an isometric view illustrating the packaging of the electrohydraulic actuator assembly with its pair of EHA units disposed inside the packaging volume.

FIG. 2 illustrates electrohydraulic actuator assembly 11 having the pair of EHA units 11A and 11B compactly packaged in an envelope, indicated by circle 40, which are directly associated with the brake fluid reservoirs 22. Hydraulic lines 42 indicate fluidic interconnection of EHA units 11A, 11B to provide brake redundancy functionality, as schematically shown by block 43 in FIG. 1 within brake system 10. As such, the ECU 34 may actuate one or both of the EHA units 11A, 11B to act in response to a brake actuation signal in order to actuate any combination of wheel braking. FIG. 3 better illustrates one of EHA units 11A, 11B to generally include an electric motor 100, a gear reduction unit 102 driven by electric motor 100 and having a first output gear 104 and a second output gear 106, a first magnetorheological (MR) clutch 108 operably associated with first output gear 104, a second MR clutch 110 operably associated with second output gear 106, a first pump 112 selectively driven by first MR clutch 108, and a second pump 114 selectively driven by second MR clutch 110. While not limited thereto, electric motor 100 is preferably a 400w continuous, 600 w peak DC motor that is controlled by ECU 34. Electric motor 100 has a motor output 116 driving an input gear 118 of gear reduction unit 102. Input gear 118 correspondingly drives both first and second output gears 104, 106 and provides a speed reduction and torque multiplication relationship. First pump 112 and second pump 114 are preferably configured as gerotor pumps 112, 114 but are understood to include any other suitable pump, such as a gear pump. MR clutches 108, 110 are also controlled by ECU 34 to regulate the drive connection between output gears 104, 106 and driveable pump members, such as pump rotors 112A, 114A associated with corresponding gerotor pumps 112, 114.

As best illustrated in the embodiment shown in FIGS. 4A through 6, gerotor pumps 112, 114 have rotatably driven pump rotors 112A, 114A that rotate with respect to a corresponding eccentric ring 112B, 114B within a pump ring 112C, 114C. The pump rotors 112A, 114A have external teeth 128 extending outwardly therefrom for engagement with internal teeth 129 extending inwardly from the eccentric ring 112B, 114B. In a preferred arrangement, a lock ring 112D, 114D is provided between the eccentric ring 112B, 114B and the pump ring 112C, 114C. The lock ring 112D, 114D is shown as having two lock protrusions 130 that correspond to lock notches 132 in the pump ring 112C, 114C. To this extent, the gerotor pumps 112, 114 can be easily assembled as will be detailed further below. To compensate for gaps between the internal and external teeth 128, 129 a spring 124 exerts spring force between pump rings 112C, 114C and lock rings 112D, 114D. In the specific arrangement illustrated in FIG. 4A, the spring is disposed within a channel 134 defined by one of the locking protrusions 130. Seals 126 are positioned between eccentric ring 112B, 114B and lock ring 112D, 114D establishing an additional force for supplementary gap compensation between teeth 128, 129. An additional spring (not shown) can be included within the gerotor pumps 112, 114 as a radial compensation mechanism. In a preferred embodiment, the gerotor pumps 112, 114 produce a pressure of approximately 150 bar.

FIGS. 5A through 5D illustrate a preferred pre-assembly machining and coating process for the pump components wherein the rotors 112A, 114A, eccentric rings 112B, 114B, pump rings 112C, 114C, and lock rings 112D, 114D are prefabricated to each have the same thickness. After fabrication, the pump ring 112C, 114C receives a surface coating 120 on at least one side (FIG. 5D) or both sides (FIG. 5C) to provide a desired axial clearance for the rotors 112A, 114A, eccentric rings 112B, 114B, and lock rings 112D, 114D. After the coating has cleared, these elements are assembled and axially sandwiched between a back plate 136 and front plate 138 as illustrated in FIGS. 3 and 5. The surface coating 120 on the pump ring 112C, 114C is preferably 2.5 microns thick, thus providing 2.5 microns of axial clearance on either side. Alternatively, the surface coating 120 can be placed on the back plate 136 or front plate 138 adjacent to the pump ring 112C, 114C.

In operation, actuation of electric motor 100 via the ECU 34 results in brake fluid being drawn from reservoir 22 and pressurized via pumps 112, 114 for delivery of pressurized brake fluid to at least one of hydraulic circuits 23, 25 to actuate hydraulic brakes 21, 39. As previously mentioned the ECU 34 response from the pedal sensor 32 can directly correlate to travel distance and pressure exertion on the brake pedal 12.

The electrohydraulic actuator assembly 11 provides an integrated solution to provide a brake-by-wire system which is easily adapted for use with an otherwise conventional hydraulically-actuated brake system. The use of MR clutches 108, 110 is preferred since operational control via ECU 34 permits highly dynamic modulated control over the rotational velocity and torque at the rotors 112A, 114A so as to accurately control the fluid pressure of the brake fluid delivered to the front and rear brakes 21, 39. This dynamic pump control based on high response rate (up to 30 Hz) MR actuator permits elimination of the need to control the brake line pressures through the conventional master cylinder and booster unit. The dynamic pump control further fulfils typical brake actuation modes including anti-lock brakes (ABS) and panic stop characterized by fast pressure rise up to 150 bar in 100 milliseconds. While electrohydraulic actuator assembly 11 is shown in FIG. 2 packaged in the existing space, it can alternatively be located anywhere in the vehicle since it does not need operator pedal pressure to function. Furthermore, electrohydraulic actuator assembly 11 can provide system redundancy via use of multiple clutches for use with various different brake circuits.

The EHA units 11A, 11B of the present disclosure solves the shortcomings of the prior art based on at least three primary principles: (1) the EHA units 11A, 11B have the ability to maintain cost effectiveness by being used in conjunction with existing braking sub-systems and components including hydraulic lines, calipers and/or rotor systems on current vehicle architectures; (2) the EHA units 11A, 11B are configured to employ an electric motor 100 and a pair of magnetorheological clutches 108 to control hydraulic system pressures generated by a pair of fluid pumps 112, 114 without the need for independent electric motors and complex caliper mechanisms at each of the four wheels; and (3) the EHA units 11A, 11B have built-in redundancies necessary for vehicular braking functionality.

As best shown in FIG. 6, the MR clutches 108, 110 provide additional improvements in operation due to their high dynamic capability being operably controlled to modulate the rotational velocity and torque supplied to the fluid pump 122, 114 from the reduction output of gear reduction unit 102. The brake system 10 can thus be a closed-loop configuration utilizing pressure sensors 57 located at the brake calipers and/or at the pump outlet. The brake system 10 may also utilize one or more hydraulic fluid filters 59 between the reservoir 22 and pump 112, 114. The fluid pumps (or gerotor pumps) 112, 114 provide a low inertia design enabling high pressure capability, as well as high pressure rise capability with minimal pressure drop via leakage.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrohydraulic brake system, comprising:
   at least one hydraulic brake;
   a brake sensor; and
   an electrohydraulic actuator assembly having at least one electrohydraulic actuator (EHA) unit operable to receive a signal from the brake sensor or ADAS ECU, the EHA unit including an electric motor, a reduction unit driven by the electric motor, and at least one fluid pump,
   wherein the fluid pump is a gerotor pump,
   wherein the gerotor pump includes a pump rotor that rotates with respect to a corresponding eccentric ring within a pump ring, and wherein a lock ring is disposed between the eccentric ring and pump ring, and
   wherein the pump rotor, eccentric ring, pump ring, and lock ring are sandwiched between a back plate and a front plate and wherein one of the pump ring, the back plate, and the front plate includes a surface coating for providing axial clearance to the pump rotor.

2. The electrohydraulic brake system of claim 1 wherein a spring is disposed between the lock ring and pump ring compensating for gaps between the pump rotor and eccentric ring.

3. The electrohydraulic brake system of claim 1 wherein the lock ring includes lock protrusions corresponding to lock notches defined by the pump ring for a rotationally fixed engagement.

4. The electrohydraulic brake system of claim 1 wherein the brake sensor includes an ADAS ECU.

5. The electrohydraulic brake system of claim 1 wherein a regeneration system is in direct electric communication with the electric motor of the EHA unit for providing electricity thereto automatically during braking.

6. The electrohydraulic brake system of claim 4 further including an at least one electrically-controlled clutch having a clutch input driven by the reduction unit, and wherein the at least one fluid pump is driven by a clutch output of the clutch.

7. The electrohydraulic brake system of claim 6 wherein the ADAS ECU is configured to actuate the electric motor and control engagement between a clutch input and the clutch output to cause the fluid pump to pump brake fluid to an at least one brake.

8. The electrohydraulic brake system of claim 7 wherein the clutch includes a magnetorheological clutch.

9. The electrohydraulic brake system of claim 1 wherein the electrohydraulic actuator assembly includes a pair of EHA units including a first EHA unit that is operable to supply pressurized brake fluid to at least one front hydraulic brake and a second EHA unit that is operable to supply pressurized brake fluid to at least one rear hydraulic brake.

* * * * *